United States Patent
Gabay et al.

(10) Patent No.: US 10,592,630 B2
(45) Date of Patent: Mar. 17, 2020

(54) APPROACH FOR VEHICLE NANO-RECTENNA PANEL

(71) Applicant: GM Global Technology Operations LLC, Detroit, MI (US)

(72) Inventors: Dor Gabay, Herzliya (IL); Mario Jodorkovsky, Nesher (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 15/710,280

(22) Filed: Sep. 20, 2017

(65) Prior Publication Data
US 2019/0087525 A1   Mar. 21, 2019

(51) Int. Cl.
| G06F 17/50 | (2006.01) |
| H02J 7/00 | (2006.01) |
| H01M 10/46 | (2006.01) |
| H02J 3/38 | (2006.01) |
| H01L 31/06 | (2012.01) |
| H02J 50/27 | (2016.01) |

(52) U.S. Cl.
CPC .......... *G06F 17/5072* (2013.01); *H01L 31/06* (2013.01); *H01M 10/465* (2013.01); *H02J 3/383* (2013.01); *H02J 7/0052* (2013.01); *H02J 50/27* (2016.02); *G06F 17/5063* (2013.01)

(58) Field of Classification Search
CPC .. G06F 17/5072; G06F 17/5063; H02J 50/27; H02J 7/0052; H02J 3/383; H01M 10/465; H01L 31/06
See application file for complete search history.

(56) References Cited

U.S. PATENT DOCUMENTS

| 4,079,268 | A  * | 3/1978 | Fletcher | H01Q 1/248 307/151 |
| 7,451,839 | B2 * | 11/2008 | Perlman | G07F 15/005 180/2.1 |
| 7,583,506 | B1 * | 9/2009 | Huang | B64G 1/428 174/252 |
| 8,441,154 | B2 * | 5/2013 | Karalis | H03H 7/40 307/104 |
| 8,667,452 | B2 * | 3/2014 | Verghese | G06F 17/5036 307/104 |
| 8,816,632 | B2 * | 8/2014 | Winfield | H02J 17/00 320/101 |
| 8,866,000 | B2 * | 10/2014 | DiDomenico | H01L 31/0352 136/246 |
| 9,018,616 | B2 * | 4/2015 | Hanein | B82Y 10/00 257/9 |

(Continued)

OTHER PUBLICATIONS

Curtarolo et al., "The high-throughput highway to computational materials design", Nature Materials: Review Article, Feb. 20, 2013, pp. 191-201.

(Continued)

*Primary Examiner* — Naum Levin
(74) *Attorney, Agent, or Firm* — Cantor Colburn LLP

(57) ABSTRACT

A method of designing a nano-rectenna panel (NRP) of a vehicle includes generating one or more performance benchmarks associated with nano-rectenna devices that comprise the NRP. A material for the nano-rectenna devices is identified based on one or more of the one or more performance benchmarks. The method also includes designing the NRP based on the material.

8 Claims, 3 Drawing Sheets

(56) References Cited

U.S. PATENT DOCUMENTS

| | | | | |
|---|---|---|---|---|
| 9,489,103 B2* | 11/2016 | Brier | ............ | G06F 3/0481 |
| 9,748,541 B2* | 8/2017 | Burke | ............ | H01M 2/0275 |
| 9,934,334 B2* | 4/2018 | Pryor | ............ | G06F 17/5009 |
| 9,972,894 B2* | 5/2018 | Dion | ............ | H01Q 1/248 |
| 10,097,051 B2* | 10/2018 | Guo | ............ | H03H 7/383 |
| 2006/0207647 A1* | 9/2006 | Tsakalakos | ............ | B82Y 20/00 |
| | | | | 136/256 |
| 2009/0234692 A1* | 9/2009 | Powell | ............ | G06F 17/5004 |
| | | | | 705/26.4 |
| 2013/0061142 A1* | 3/2013 | Brier | ............ | G06F 3/0481 |
| | | | | 715/709 |
| 2014/0025343 A1* | 1/2014 | Gregg | ............ | G06F 17/5004 |
| | | | | 703/1 |
| 2014/0266967 A1* | 9/2014 | Ramahi | ............ | H01Q 1/248 |
| | | | | 343/867 |
| 2015/0066442 A1* | 3/2015 | Pryor | ............ | G06F 17/5009 |
| | | | | 703/1 |
| 2015/0144198 A1* | 5/2015 | Irwin | ............ | H01G 9/2059 |
| | | | | 136/263 |
| 2016/0261031 A1* | 9/2016 | Dion | ............ | H01Q 1/248 |
| 2016/0308402 A1* | 10/2016 | Alavikia | ............ | H01Q 21/065 |
| 2016/0380486 A1* | 12/2016 | Hajimiri | ............ | B64G 1/44 |
| | | | | 307/104 |
| 2017/0271542 A1* | 9/2017 | Fafard | ............ | H01L 31/109 |
| 2018/0040820 A1* | 2/2018 | Mann | ............ | G01J 5/0837 |
| 2018/0062448 A1* | 3/2018 | Hubler | ............ | H04B 5/0031 |
| 2018/0157783 A1* | 6/2018 | Moroz | ............ | G06F 17/5031 |
| 2018/0342910 A1* | 11/2018 | Bergsrud | ............ | H02J 50/90 |

OTHER PUBLICATIONS

Marques et al., "Time-Dependent Density Functional Theory", Annu. Rev. Phys. Chem., 2004, pp. 427-457.

* cited by examiner

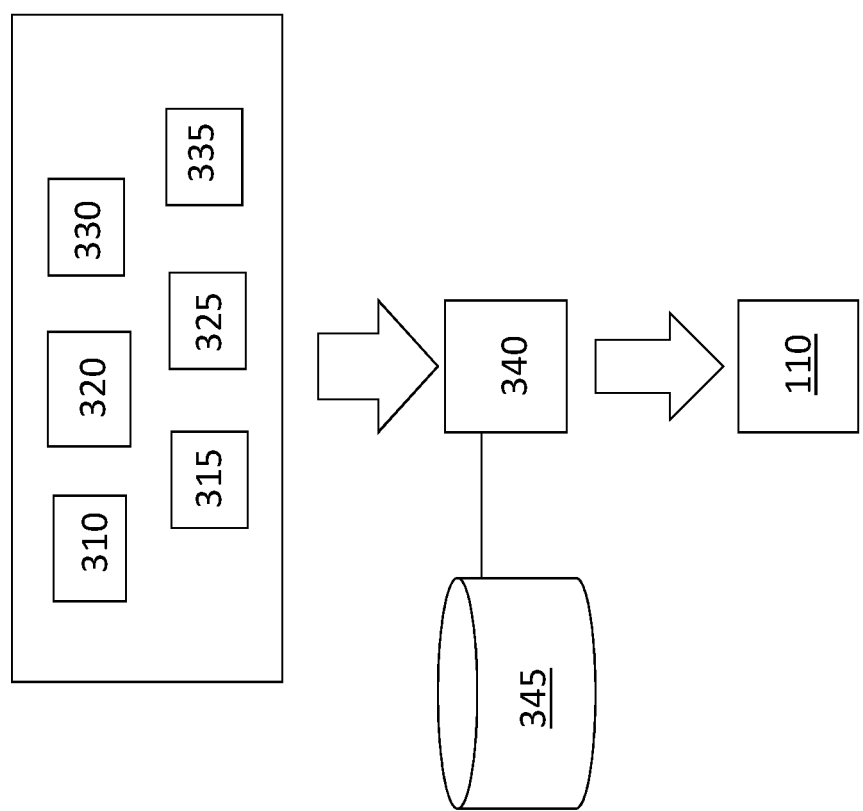

APPROACH FOR VEHICLE NANO-RECTENNA PANEL

INTRODUCTION

The subject disclosure relates to a design approach for a vehicle nano-rectenna panel.

Solar panels facilitate the absorption of sunlight to generate direct current (DC). Typically, the efficiency of the solar panel modules with photovoltaic cells is less than 25 percent. Microwave rectennas absorb microwave electromagnetic energy and output DC. These radio frequency (RF) rectennas in the microwave range have reached power conversion efficiencies in the range of 85 percent to 90 percent. While the microwave rectennas exhibited increased efficiency, absorption of energy at lower frequencies (i.e., higher wavelengths) is needed to facilitate reduced size in comparison with traditional solar panels. Accordingly, it is desirable to provide a design approach for a vehicle nano-rectenna panel.

SUMMARY

In one exemplary embodiment, a method of designing a nano-rectenna panel (NRP) of a vehicle includes generating one or more performance benchmarks associated with nano-rectenna devices that comprise the NRP. A material is identified for the nano-rectenna devices based on one or more of the one or more performance benchmarks. The method also includes designing the NRP based on the material.

In addition to one or more of the features described herein, the generating the one or more performance benchmarks includes generating a benchmark for power absorbed by the NRP.

In addition to one or more of the features described herein, the generating the one or more performance benchmarks includes generating a benchmark for directivity of the NRP.

In addition to one or more of the features described herein, the generating the one or more performance benchmarks includes generating a benchmark for beam solid angle of the NRP.

In addition to one or more of the features described herein, the generating the one or more performance benchmarks includes generating a benchmark for divergence of current density.

In addition to one or more of the features described herein, the generating the one or more performance benchmarks includes generating a benchmark for thermal power dissipation.

In addition to one or more of the features described herein, the generating the one or more performance benchmarks includes generating a benchmark for energy transfer from electrodes to the nano-rectenna devices.

In addition to one or more of the features described herein, the identifying the material includes searching a database of known materials and corresponding characteristics for a match with the one or more performance benchmarks.

In addition to one or more of the features described herein, the identifying the material includes defining material characteristics based on the one or more performance benchmarks.

In addition to one or more of the features described herein, the identifying the material includes searching a database of known materials and corresponding characteristics for a match with the material characteristics.

In another exemplary embodiment, a method of designing an on-board battery charger for a vehicle includes estimating a size of the NRP based on a surface area of the vehicle, and generating one or more performance benchmarks associated with nano-rectenna devices that comprise the NRP. The method also includes identifying a material for the nano-rectenna devices based on one or more of the one or more performance benchmarks, and designing the NRP based on the material. A controller is designed to couple a battery of the vehicle to the NRP.

In addition to one or more of the features described herein, the generating the one or more performance benchmarks includes generating a benchmark for power absorbed by the NRP.

In addition to one or more of the features described herein, the generating the one or more performance benchmarks includes generating a benchmark for directivity of the NRP.

In addition to one or more of the features described herein, the generating the one or more performance benchmarks includes generating a benchmark for beam solid angle of the NRP.

In addition to one or more of the features described herein, the generating the one or more performance benchmarks includes generating a benchmark for divergence of current density.

In addition to one or more of the features described herein, the generating the one or more performance benchmarks includes generating a benchmark for thermal power dissipation.

In addition to one or more of the features described herein, the generating the one or more performance benchmarks includes generating a benchmark for energy transfer from electrodes to the nano-rectenna devices.

In addition to one or more of the features described herein, the identifying the material includes searching a database of known materials and corresponding characteristics for a match with the one or more performance benchmarks.

In addition to one or more of the features described herein, the identifying the material includes defining material characteristics based on the one or more performance benchmarks.

In addition to one or more of the features described herein, the identifying the material includes searching a database of known materials and corresponding characteristics for a match with the material characteristics.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a process flow of a method of designing a nano-rectenna panel as part of an on-board battery charging system of a vehicle according to one or more embodiments.

DETAILED DESCRIPTION

Figure 1:
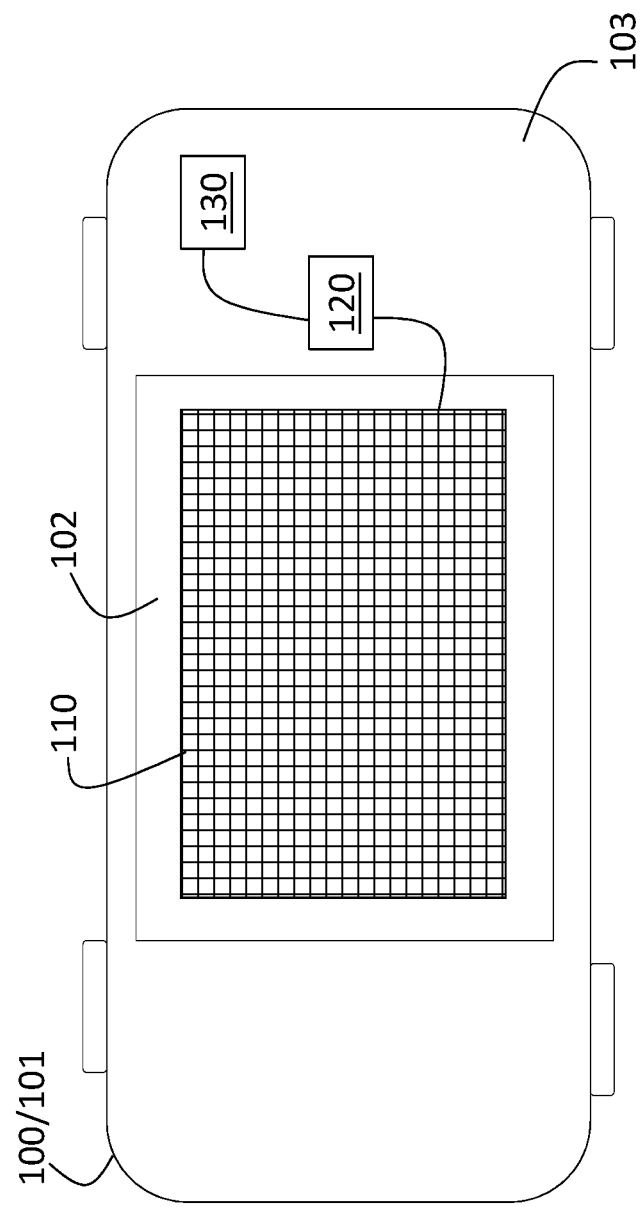
FIG. 1 is a block diagram of an on-board charging system designed according to one or more embodiments.

The following description is merely exemplary in nature and is not intended to limit the present disclosure, its application or uses.

As previously noted, microwave rectennas currently exhibit higher efficiencies as compared with traditional solar panels. However, modules that can convert lower frequency visible and infrared light to current are more desirable because of the ready availability of the source energy, solar energy, and because smaller sized devices may be used at the lower frequencies, thereby increasing installation locations. Thus, rectennas with higher efficiency than photovoltaic cells to convert visible and infrared radiation to electrical power have been explored. The shorter the wavelength of radiation (the higher the frequency), the smaller the rectenna device must be that converts the radiation to power. Visible light has a much higher frequency than microwave radiation. Thus, rectennas in the nanometer range (i.e., nanoscale devices) are needed to convert visible and infrared light to electrical power. However, nanoscale devices implicate quantum mechanical effects in addition to electromagnetic effects.

Exemplary nano-rectennas include carbon nanotube optical rectennas, log-periodic, square-spiral, Archimedian-spiral antennas, and dual Vivaldi antennas. Carbon nanotube optical rectennas include arrays of multiwall carbon nanotubes (MWCNT) coupled to nanoscale rectifying diodes. The antenna diodes have relatively low antenna resistance and rectenna capacitance on the order of 2 attofarad to allow operation at a switching frequency around 1 picohertz. The MWCNTs can absorb electromagnetic radiation in the entire electromagnetic spectrum due to their free carrier and excitonic absorption processes. The MWCNT tip may have a diameter on the order of 8-10 nanometers and MWCNTs are temperature insensitive. Dual Vivaldi antennas also have the potential for generating high rectification efficiency due to low return loss (less than −9.5 dB). Unlike the dependence on MWCNTs by metal/insulator/metal (MIM) diode rectennas, dual Vivaldi antennas have no dependence on chirality of the material used. Theoretically, dual Vivaldi antennas may be more temperature sensitive than MIM diode rectennas that use MWCNTs.

An approach to designing these nano-rectenna devices involves the use of trial and error to select the material that absorbs and converts visible and infrared light. The large number of available materials that absorb energy from visible and infrared light and output DC are tested to determine their viability for a given application such as the vehicle charging application. Embodiments of the systems and methods detailed herein relate to a systematic design approach for vehicle-based nano-rectenna panels (NRPs). Specifically, two types of approaches are discussed according to the embodiments detailed herein. According to one high throughput material (HTM) approach, an objective (e.g., the dynamics of interest) is searched by minimizing a set of physical constraints using physics-based simulations and a database of available materials. According to another quantum optimal control (QOC) approach, preferred values for the physical constraints are used to find the materials of interest. These approaches are further detailed below. Constraints or properties considered in the design approaches include power, area, directionality, solid beam angle, divergence of current density, thermal power dissipation, and efficient passage of energy from electrodes to the rectenna. These may be among the properties that are characterized to facilitate the identification of a viable material for the nano-rectenna panel using one of the approaches.

In accordance with an exemplary embodiment, FIG. 1 is a block diagram of an on-board charging system. The exemplary vehicle 100 shown in FIG. 1 is an automobile 101. The system includes a nano-rectenna panel (NRP) 110, controller 120, and the battery 130 that is charged. A typical battery 130 in a vehicle 100 with a combustion engine may charge to 13.5 volts direct current (VDC) and 6 amperes (A). In an electric vehicle 100, the battery 130 may be a lithium ion battery and may charge to a range of 15-30 A and 115-230 volts alternating current (VAC). The controller 120 processes the output of the NRP 110, as needed, for the battery 130. For example, for the lithium ion battery 130, the controller 120 converts the DC output of the NRP 110 to the alternating current (AC) needed by the battery 130. The NRP 110 is shown on the roof 102 of the automobile 101 but may additionally or alternatively be disposed on the hood 103 or other surfaces of the vehicle 100.

Figure 2:
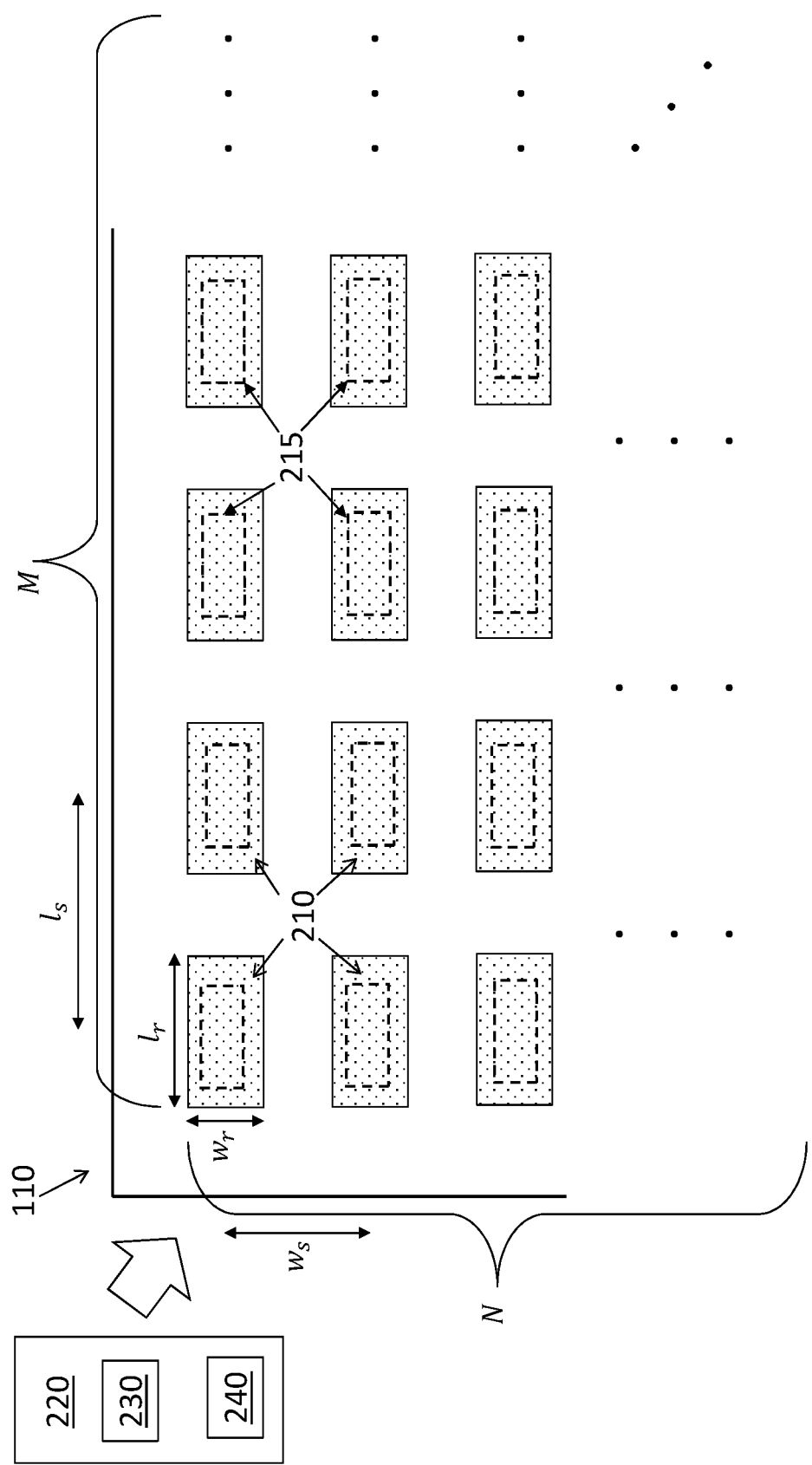
FIG. 2 shows a processing system to design aspects of an exemplary nano-rectenna panel according to one or more embodiments.

FIG. 2 shows a processing system 220 to design aspects of an exemplary NRP 110 according to one or more embodiments. The processing system may include an application specific integrated circuit (ASIC), an electronic circuit, a processor 230 (shared, dedicated, or group) and memory 240 that executes one or more software or firmware programs, as shown in FIG. 2, a combinational logic circuit, and/or other suitable components that provide the described functionality.

The processing system 220 is used to set the benchmarks that facilitate identification of the material of the nano-rectenna devices 210 that make up the NRP 110. The benchmarks may be different for each application that requires a different NRP 110. For example, the size requirement or power requirement for the NRP 110 differ based on the battery 130, whether the battery 130 is expected to be fully or partially charged within a given period of time, and other factors discussed with reference to FIG. 3. A material may then be identified for the the nano-rectenna devices 210 that make up the NRP 110 to meet the criteria set by the benchmarks.

The exemplary NRP 110 shown in FIG. 2 includes M nano-rectenna devices 210 along one dimension (referred to herein as the length of the NRP 110 for explanatory purposes) and N nano-rectenna devices 210 along the perpendicular dimension (referred to as the width of the NRP 110 for explanatory purposes). An electrode 215 forms the interface between each nano-rectenna device 210 and the NRP 110 panel. Each electrode 215 is a conductor (e.g., copper, titanium, brass, silver). As indicated in FIG. 2, each nano-rectenna device 210 has a length $l_r$ and width $w_r$. Adjacent nano-rectenna devices 210 are separated by $l_s$ in the length direction and by $w_s$ in the width direction. These dimensions are among the parameters that must be selected, in addition to the material of the nano-rectenna devices 210, for each application of the NRP 110.

FIG. 3 is a process flow of a method of identifying a material for nano-rectenna devices 210 of a NRP 110 according to one or more embodiments. Specifically, the method includes developing benchmarks that are then used to identify a material of the nano-rectenna devices 210. The NRP 110 comprised of the nano-rectenna devices 210 is part of an on-board battery charging system of a vehicle 100. At block 310 a benchmark is created for the power absorbed by the NRP 110. As detailed, creating the benchmarks includes making assumptions and estimates regarding the dimensions and effective area of the NRP 110. At block 320, a benchmark is created for the directivity $D_0$ of the NRP 110, and at block 330, a benchmark is created for the beam solid angle $\Omega_A$, which is the angle for which radiated power is maximally received by the NRP 110.

At block 340, the benchmarks developed at blocks 310, 315, 320, 325, 330, and 335 are used to guide the selection of the material used for the nano-rectenna devices 210. As previously noted, two different approaches may be used to either search for a match among materials based on constraints or define the material according to constraints. FIG. 3 shows a database 345 of materials and corresponding properties that may be searched at block 340 according to one embodiment. That is, the characteristics specified by the benchmarked parameters (at blocks 310, 315, 320, 325, 330, and 335) may be compared with characteristics corresponding with known materials in the database 345. According to an alternate embodiment, the benchmarks developed at blocks 310, 315, 320, 325, 330, and 335 are used to define material characteristics. Based on the material determined at block 340, the NRP 110 design is completed. Exemplary benchmarking analysis is detailed.

The analysis involved with developing (at block 310) an exemplary benchmark for the power absorbed by the NRP 110 is detailed. The average power radiated by the sun through the atmosphere $P_{rad}$ is 1.12 kilowatts per meters-squared (kW/m²) with 52-55 percent of the radiation composed of infrared waves and 42-43 percent of the radiation composed of visible light. With the wavelength of optimal operation of a given rectenna being unspecified and assuming an efficiency κ of 0.75, the power absorbed per square meter $P_{rect}$ of each nano-rectenna device 210 is given by:

$$P_{rect} = \frac{\kappa}{100} P_{rad} \approx 0.84 \frac{kW}{m^2} \quad [EQ. 1]$$

The average length $l_v$ and width $w_v$ of a vehicle 100 are assumed to be $l_v$=4.8 meters (m) and $w_v$=1.8 m. The total surface area of a typical vehicle 100 is assumed to be proportional to a product of its length lv and width $w_v$ (i.e., $l_v * w_v$). The efficiency γ of a nano-rectenna device 210 can reach 80 percent, and the area of absorption AR is governed by is approximate length $l_r$ and width $w_r$, which are assumed to both be $2*10^{-7}$ m (a square NRP 110 is assumed). Within an NRP 110, the nano-rectenna devices 210 are spaced apart by ws and ls, as shown in FIG. 2. Given that $w_s=2*10-7$ m and $l_s$=0 (e.g., in a Vivaldi antenna), the total area $\beta_{rect}$ that the nano-rectenna devices 210 encompass per square meter is:

$$\beta_{rect} = \left(\frac{l_r}{l_s+l_r}\right) \cdot \left(\frac{w_r}{w_s+w_r}\right) = \frac{1}{2} \quad [EQ. 2]$$

The power absorbed by the NRP 110 ($P_{NRP}$) or total potential solar energy consumed in the spectrum range covered by the nano-rectenna devices 210 is:

$$P_{NRP}=P_r l_v w_v \beta_{rect}=3628.8W \quad [EQ. 3]$$

In order to determine if the absorbed power PNRP value obtained in EQ. 3 is an appropriate benchmark to be used in identifying the material (at block 340), further analysis can be performed using the processing system 220. Specifically, the absorbed power of $P_{NRP}$=3628.8 W (i.e., Joules per second) can be analyzed in terms of its potential in charging a lithium-ion battery 130 (e.g., the amount of time to charge completely, the ratio of charging to energy consumed during a drive) in the case of application to an electric vehicle 100. The specific energy $E_{lith}$ of a lithium-ion battery 130 of an electric vehicle 100 is 0.55 mega Joules per kilogram (MJ/kg) and its weight mhth can reach 290 kg. Thus, with the $P_{NRP}$ computed in EQ. 3, the time to fully charge an electric vehicle 100 in hours is given by:

$$\text{time} - \text{to} - \text{charge} = \frac{E_{lith} m_{lith}}{P_{NRP}} \approx 12.2 \text{ hours} \quad [EQ. 4]$$

When an electric vehicle 100 has a fuel economy of 16 kilowatt hour per 100 kilometer (kW hr/km) is driven at a speed of 100 km/hr, the power dissipated by the electric vehicle 100 Pv is 16 kW (i.e., kilojoules per second). Thus, the ratio of charging time (Pv/$P_{NRP}$) to energy consumed is 4.4 to 1. This indicates that the exemplary lithium-ion battery 130 of the exemplary electric vehicle 100 cannot be recharged in real time based on the benchmark $P_{NRP}$ determined at EQ. 3. If the application of the NRP 110 was to augment or extend the driving distance of the exemplary electric vehicle 100, then the benchmark PNRP may be acceptable. If the $P_{NRP}$ computed at EQ. 3 is retained but a full recharge were desired, the area of the nano-rectenna devices 210 needed could be computed. With $w_s \approx 5 \times 10^{-8}$ m, the $\beta_{rect}$ is 4/5. Then the area ANRP of the NRP 110 needed to facilitate real-time recharging of the exemplary lithium-ion battery 130 can be computed as:

$$A_{NRP} = A_R \left(\frac{P_{v60}}{P_{NRP}} - 1\right) = 15.17 m^2 \quad [EQ. 5]$$

The analysis involved with developing (at block 320) an exemplary benchmark for the directivity $D_0$ includes considering a distribution of power absorption by the NRP 110. The $D_0$ value should be high enough to ensure that radiation perpendicular to the NRP 110 will be absorbed but should not be so high that radiation at all angles other than perpendicular will not be absorbed. With a selected maximum wavelength of interest λ, the spacing (shown in FIG. 2) should be such that $\lambda > l_s = w_s > \lambda/2$. The two-dimensional array factor (AF), which is the angular distribution of the normalized power of the two-dimensional array) can be expressed as:

$$AF(\theta, \phi) = \left\{\frac{1}{M} \frac{\sin(M\psi_x/2)}{\sin(\psi_x/2)}\right\} \left\{\frac{1}{N} \frac{\sin(N\psi_y/2)}{\sin(\psi_y/2)}\right\} \quad [EQ. 6]$$

In EQ. 6, M and N are the number of nano-rectenna devices 210 in the length and width dimensions as discussed with reference to FIG. 2, the angle θ is on the same plane (xy plane) as the nano-rectenna devices 210 in spherical coordinates, φ is on the plane (z plane) that is perpendicular to the plane of the nano-rectenna devices 210 in spherical coordinates, and the angles, respectively, in the xz plane and the yz plane are given by:

$$\psi_x = kdx(\sin\theta\cos\phi - \sin\theta_0\cos\phi_0) \quad [EQ. 7]$$

$$\psi_y = kdy(\sin\theta\cos\phi + \sin\theta_0\sin\phi_0) \quad [EQ. 8]$$

In EQ. 7 and EQ. 8, k is the wave number ($2\pi/\lambda$), dx is the total length ($N^*w_s$), dy is the total length ($M^*l_s$), and $\{\theta_0, \phi_0\}$ is the chosen direction of the main lobe (set perpendicular to the plane of the NRP 110). The corresponding directivity is given by:

$$D_0 = \frac{4\pi[AF(\theta_0, \phi_0)][AF(\theta_0, \phi_0)]^*|_{max}}{\int_0^{2\pi}\int_0^{2\pi}[AF(\theta, \phi)][AF(\theta, \phi)]^*\sin\theta d\theta d\phi} \quad [\text{EQ. 9}]$$

The analysis involved with developing (at block 330) an exemplary benchmark for the beam solid angle, which is the angle for which the radiated power is maximally received, includes determining the elevation and perpendicular plane half power beamwidth constants $\Theta_{x0}$ and $\Theta_{y0}$. Then the beam solid angle $\Omega_A$ can be computed as:

$$\Omega_A = \left[\sqrt{\frac{1}{\cos^2\theta_0(\Theta_{x0}^{-2}\cos^2\phi_0 + \Theta_{y0}^{-2}\sin^2\phi_0)}}\right] \quad [\text{EQ. 10}]$$

$$\left[\sqrt{\frac{1}{\Theta_{x0}^{-2}\sin^2\phi_0 + \Theta_{y0}^{-2}\cos^2\phi_0}}\right]$$

The analysis involved in developing (at block 315) an exemplary benchmark for divergence of current density is based on ensuring a uniform filed (i.e., maximizing flow along a single direction and minimizing the curl or vorticity of current). Current density may be expressed with respect to the single-electron orbitals as:

$$j = \frac{i\hbar}{2m}\Sigma_i(\phi_i\nabla\phi_i^* - \phi_i^*\nabla\phi_i) \quad [\text{EQ. 11}]$$

In EQ. 11, $\hbar$ is Planck's constant, m is the mass of the electron, and $\phi_i$ is a single electron orbital of the electronic structure.

The analysis involved in developing (at block 325) a benchmark for thermal power dissipation is to ensure that minimal thermal energy is created, via phonon excitation and other processes. Minimizing the dissipated energy ensure stability of the system (e.g., an approximately constant operating temperature). Total thermal power dissipated from nano-rectenna devices 210 of the NRP 110 is:

$$P_d = \iiint j \cdot E \partial r \quad [\text{EQ. 12}]$$

In EQ. 12, E is the external electric field and r=(x, y, z) is the coordinate system by which volumetric integration is applied.

The analysis involved in developing (at block 335) a benchmark for the passage of energy from the electrodes 215 to the nano-rectenna devices 210 involves enforcing a value of one for the ratio of the power transferred from the electrodes 215 to the nano-rectenna devices 210 to the power rectified by the nano-rectenna devices 210.

At block 340, according to one embodiment, a HTM approach may be used to search for the material of the nano-rectenna devices 210. The HTM approach aims at searching for an objective (dynamics of interest) by minimizing a set of physical constraints using physics-based simulations (typically by use of first principle methods) and the database 345 of available materials. According to another embodiment, QOC may be employed to use the preferred values for the physical constraints to find the materials of interest. In QOC, the processor is provided the properties of interest (e.g., high rectification) in an effort to define, via first principle methods (physics based simulations), a set of material characteristics which satisfy the required properties. One could then provide the required excited state properties to determine the electronic structure which allows for high rectification (for example) in the infrared/visible light spectrum. Once an electronic structure is determined, the material database 345 may be used to find the set of hybrid materials which allow for the specified electronic distribution.

The physics based simulations play a critical role in both the proposed schemes. A dynamic mean field theory known as Time-Dependent Density Functional Theory (TDDFT) is used to characterize the electronic structure for the many-body system. The Hamiltonian provides an energy-momentum relation of the system under study. A typical vector gauge Hamiltonian H, used along with the Coulomb gauge fixing condition would take the following form:

$$H = \frac{1}{2m}\left(i\hbar\nabla + \frac{q}{c}A_{s,\sigma}(r,t)\right)^2 + v_{s,\sigma}(r,t) \quad [\text{EQ. 13}]$$

In EQ. 13, $v_s$ is the scalar potential containing the static ground state contributions while As is the vector potential containing the dynamical contributions. The electromagnetic field is fed into $\{v_s, As\}$ the Hamiltonian is solved iteratively (self-consistently). $\hbar$ is Planck's constant divided by 2*pi, q is the electron charge, m is the electron mass, and c is the speed of light. Single-particle electron orbitals (e.g. $\phi_i$ from Equation 11) are evolved iteratively over time along with an adiabatic approximation to the exchange-correlation scalar potential (contained within As and $v_s$). It is assumed that dynamic correlations (represented by a specific component within As within H) are small enough within the system to be ignored. Both longitudinal (instantaneous) and transverse retarted (i.e., the electromagnetic effects which are time-delayed (e.g. dynamic) internal electromagnetic) effects are considered within the scalar and vector potential, respectively. The external field is contained within the effective (total) vector potential. The Hamiltonian is used to characterize the physics-based solver which was mentioned previously. The longitudinal and transverse components of the electromagnetic field are used as additional constraints (along with directivity, etc.) for searching through the database of materials for an optimal nano-rectenna design.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. A method of designing a nano-rectenna panel (NRP) of a vehicle, the method comprising:
   generating one or more performance benchmarks associated with nano-rectenna devices that comprise the NRP;

identifying, using a processor, a material for the nano-rectenna devices based on one or more of the one or more performance benchmarks, wherein the identifying the material includes searching a database of known materials and corresponding characteristics for a match with the one or more performance benchmarks or defining material characteristics based on the one or more performance benchmarks; and designing the NRP based on the material.

2. The method according to claim 1, wherein the generating the one or more performance benchmarks includes generating a benchmark for power absorbed by the NRP.

3. The method according to claim 1, wherein the generating the one or more performance benchmarks includes generating a benchmark for directivity of the NRP.

4. The method according to claim 1, wherein the generating the one or more performance benchmarks includes generating a benchmark for beam solid angle of the NRP.

5. The method according to claim 1, wherein the generating the one or more performance benchmarks includes generating a benchmark for divergence of current density.

6. The method according to claim 1, wherein the generating the one or more performance benchmarks includes generating a benchmark for thermal power dissipation.

7. The method according to claim 1, wherein the generating the one or more performance benchmarks includes generating a benchmark for energy transfer from electrodes to the nano-rectenna devices.

8. The method according to claim 1, wherein the identifying the material includes searching a database of known materials and corresponding characteristics for a match with the material characteristics based on the identifying the material including defining the material characteristics based on the one or more performance benchmarks.

* * * * *